(12) United States Patent
Bortz et al.

(10) Patent No.: US 6,553,043 B1
(45) Date of Patent: Apr. 22, 2003

(54) OVERCOMING L-I KINK EFFECTS IN A LASER DIODE FEEDBACK CONTROL

(75) Inventors: Michael L. Bortz, Columbia, MD (US); David G. Mehuys, Sunnyvale, CA (US); Bernard G. Fidric, Cupertino, CA (US); John deAndrea, Lawrenceville, NJ (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 09/260,443

(22) Filed: Mar. 1, 1999

Related U.S. Application Data

(60) Provisional application No. 60/076,828, filed on Mar. 2, 1998.

(51) Int. Cl.$^7$ .............................................. H04B 10/00
(52) U.S. Cl. ................................ 372/26; 372/38; 372/1
(58) Field of Search ........................ 372/29.02, 6, 26, 372/43, 75, 50, 23

(56) References Cited

U.S. PATENT DOCUMENTS

| | | | | |
|---|---|---|---|---|
| 5,297,154 A | | 3/1994 | Heidemann et al. ............ 372/6 |
| 5,394,492 A | * | 2/1995 | Hwang ......................... 385/33 |
| 5,396,506 A | * | 3/1995 | Ball ............................... 372/6 |
| 5,499,135 A | | 3/1996 | Heidemann et al. ........ 359/341 |
| 5,657,148 A | * | 8/1997 | Feuer .......................... 359/263 |
| 5,737,109 A | * | 4/1998 | Goodwin ..................... 359/161 |

\* cited by examiner

Primary Examiner—Paul Ip
Assistant Examiner—Dung Nguyen

(57) ABSTRACT

The negative effects of kinking in the L-I characteristics of laser diode operation with respect to feedback control for laser diode current control is suppressed by either (1) combining the output of a plurality of laser diodes together or (2) by imparting a current modulation superimposed on the direct driving current of the laser diode in conjunction with a limited feedback bandwidth, or a combination of both approaches (1) and (2).

7 Claims, 4 Drawing Sheets

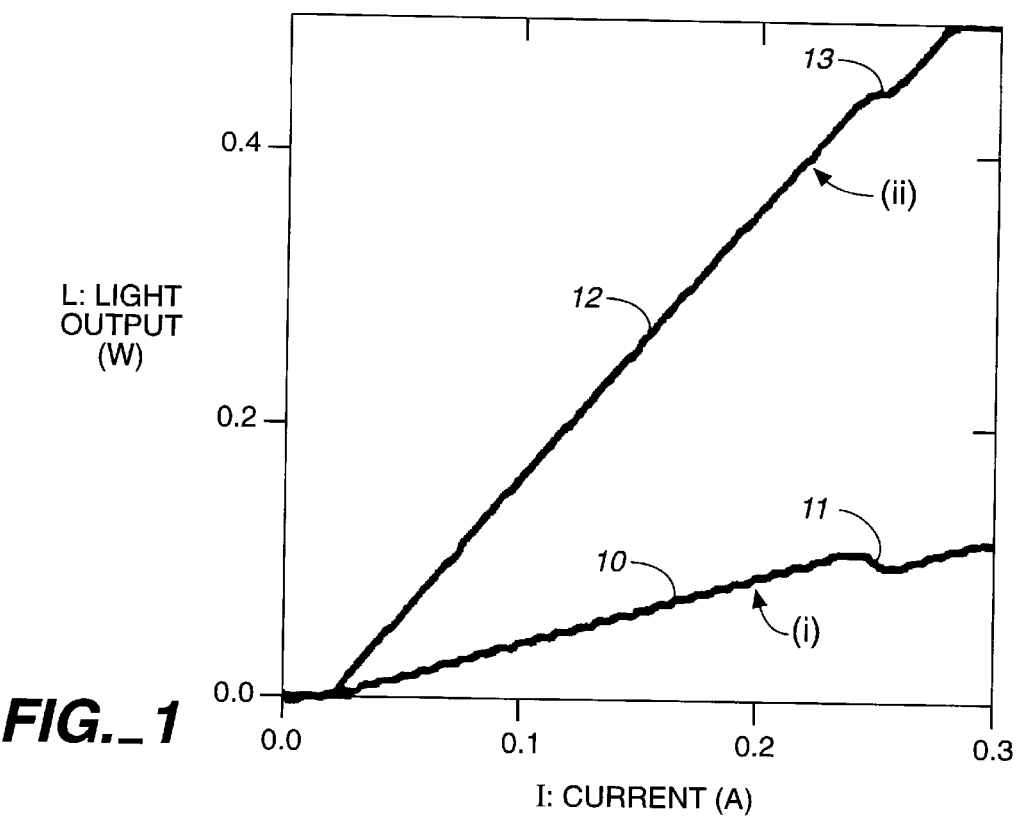
FIG._1
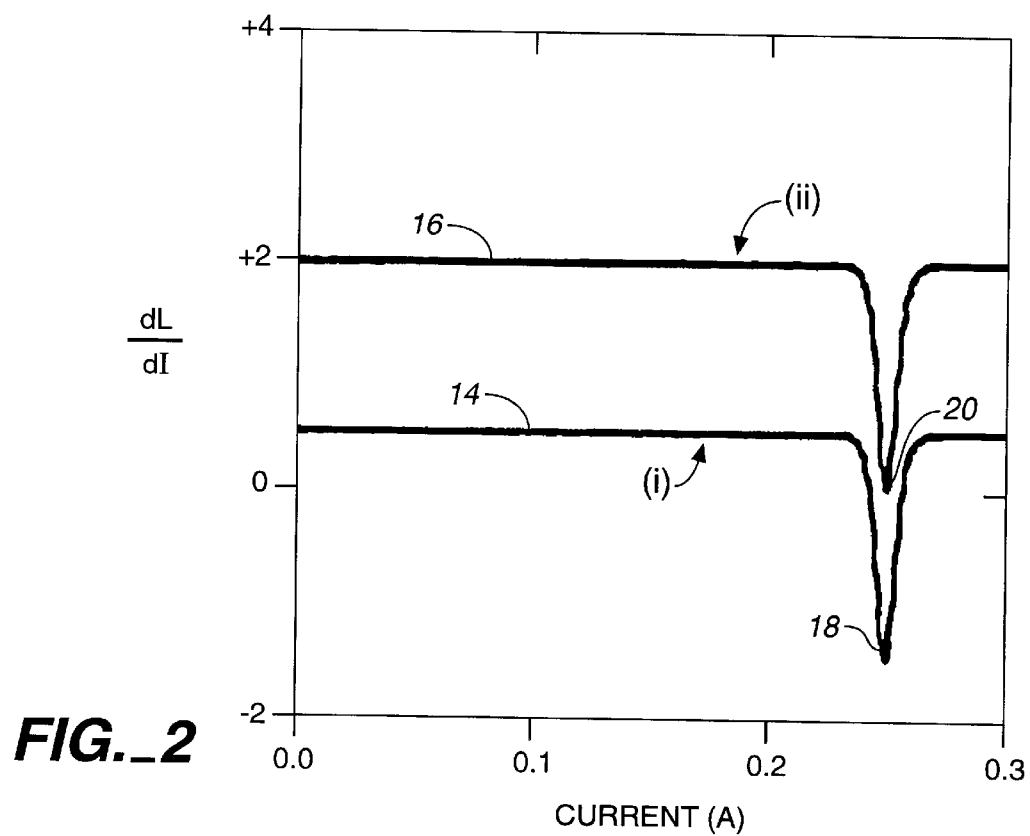
FIG._2

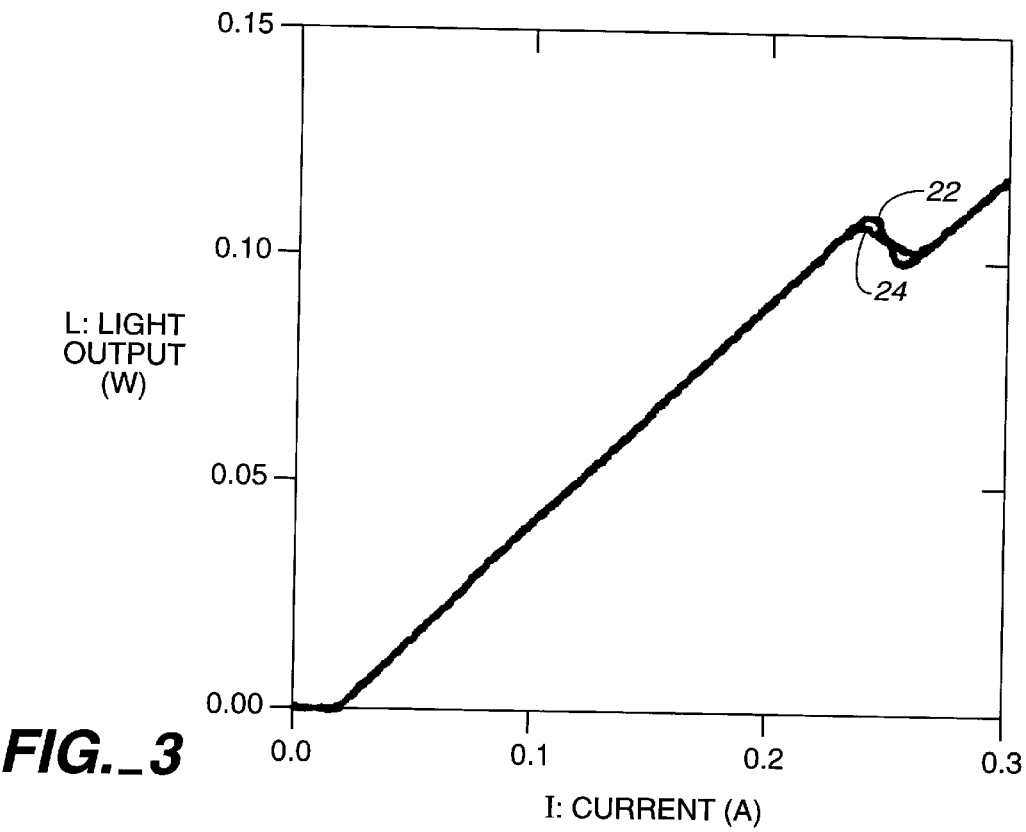
FIG._3
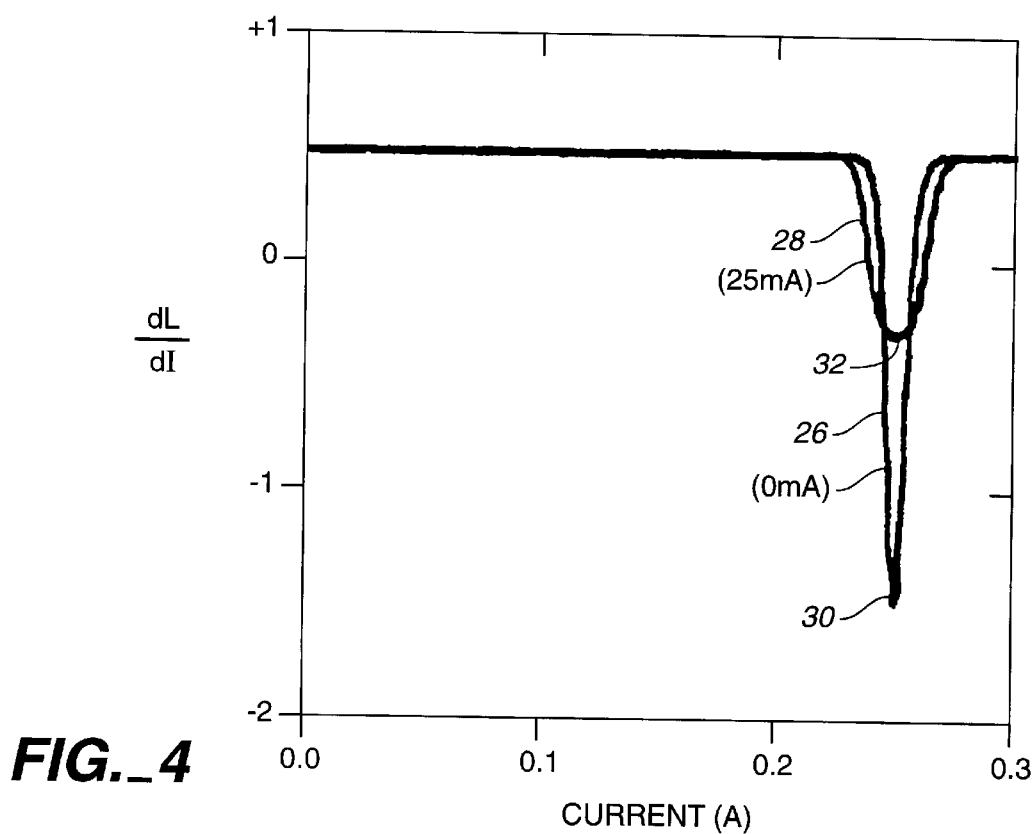
FIG._4

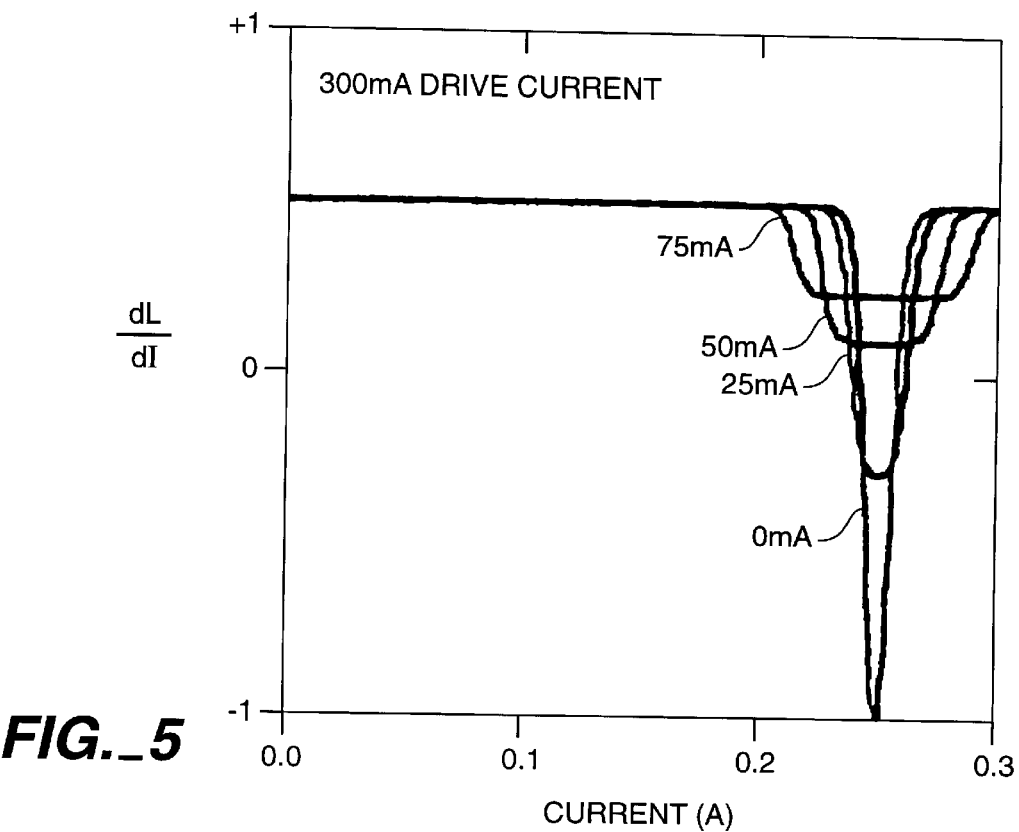
FIG._5
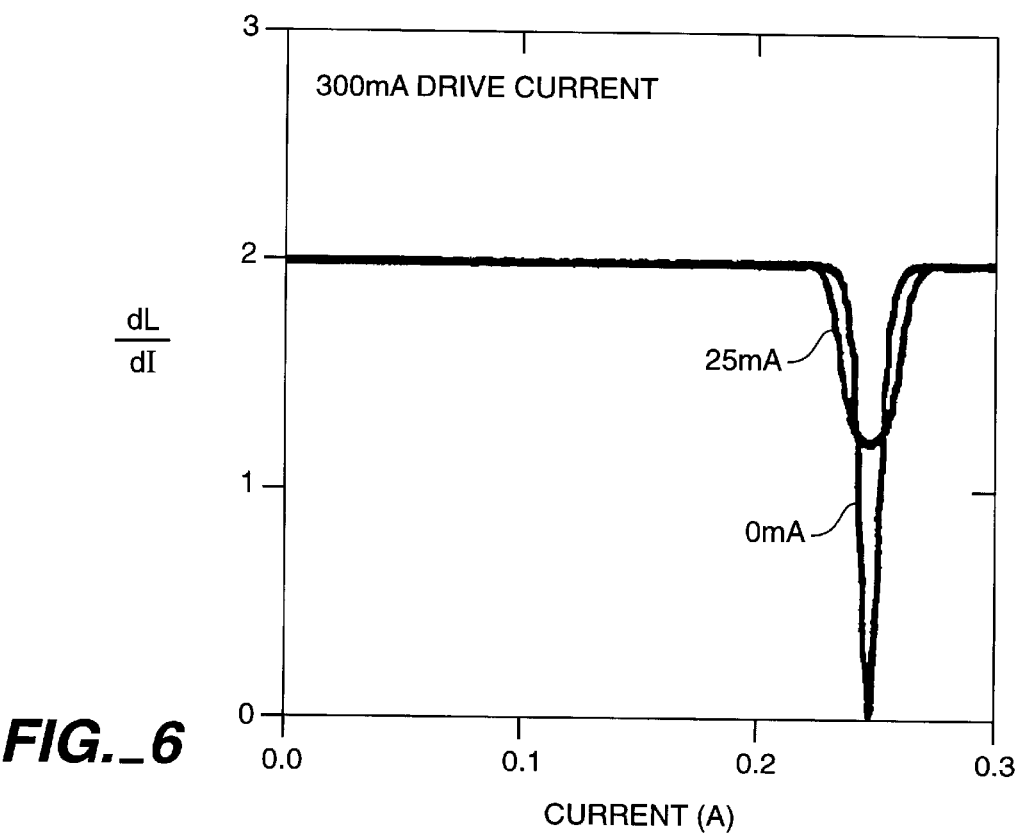
FIG._6

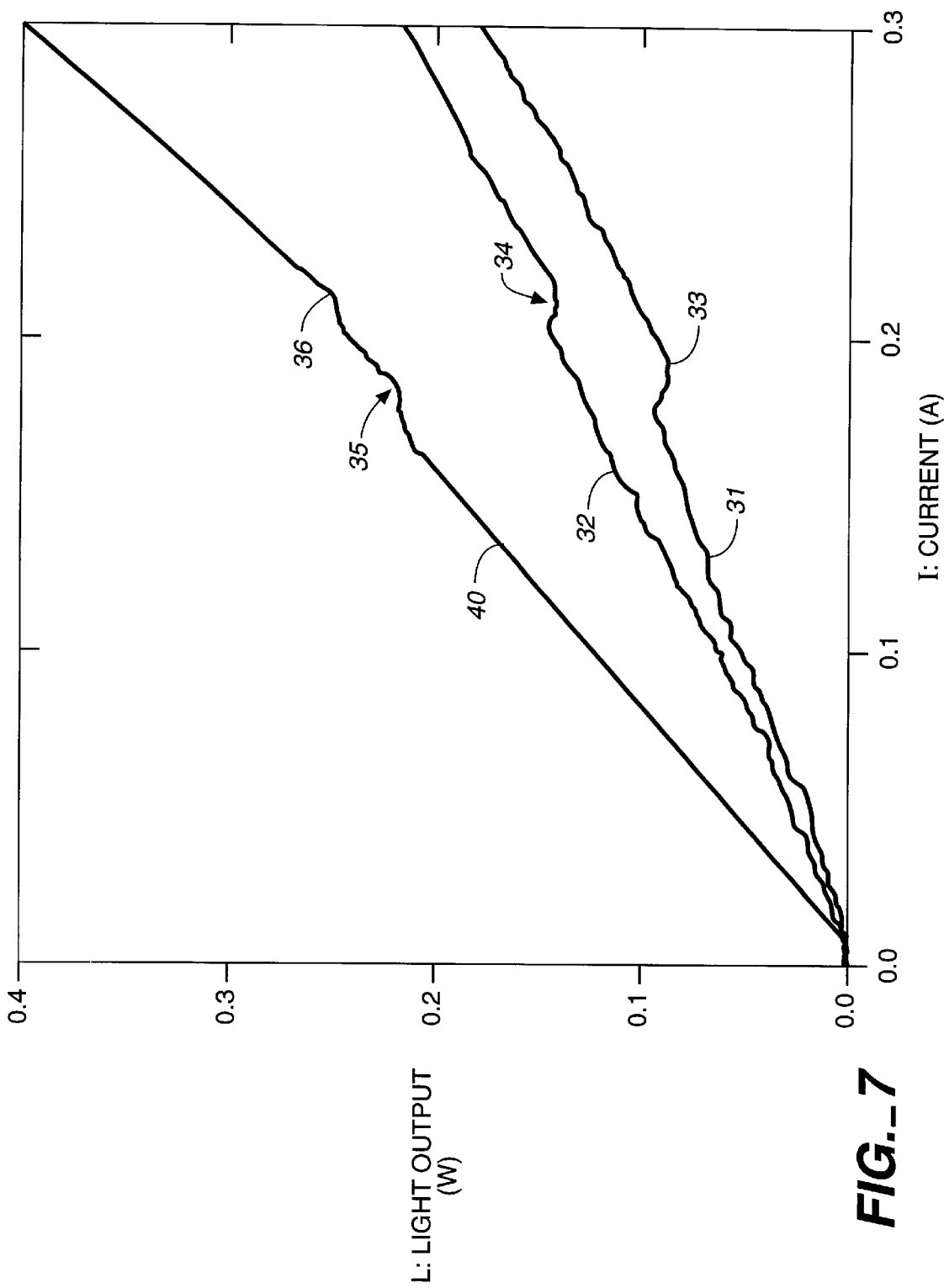
FIG._7

OVERCOMING L-I KINK EFFECTS IN A LASER DIODE FEEDBACK CONTROL

REFERENCE TO RELATED APPLICATION

This is a continuation of provisional application, Ser. No. 60/076,828, filed Mar. 2, 1998, entitled "SYSTEM INTEGRATION STRATEGIES FOR LASER DIODE KINK REDUCTION", which is incorporated herein by its reference.

FIELD OF THE INVENTION

This invention relates generally to diode laser control and more particularly to the suppression or altering system kink response of occurring in the output of multiple laser diodes.

BACKGROUND OF THE INVENTION

Laser diode kinking along the L-I characteristic curve for a laser diode generally results in a sign change in the slope efficiency, dL/dI. Kinking inverts the phase of the feedback employed in laser diode systems utilizing closed loop control with a detection system for the output power to provide a feedback signal to change the drive current to the laser diode. When the sign of the slope efficiency changes relative to the output power, there results power instability and laser control problems. Problems in control of kinking can be solved by employing sophisticated digital methods to overcome a particular dL/dI anomaly in the system. However, a simpler solution, compared to such a more expensive approach, is more desirable for commercial applications in the control of laser diode systems.

Thus, it is a primary object of this invention to suppress L-I kinking in the output of a laser diode source or sources and its negative effect in feedback control of laser diode current operation.

SUMMARY OF THE INVENTION

According to this invention, in one approach, multiple laser diode output are combined so that the negative value effects of current change due to L-I kinking are suppressed. In an alternate approach, a high frequency dither is imparted on the pump current supplied to the laser diodes and its applied frequency is limited in effective bandwidth of the detection system to less than the dither frequency. A further and more successful approach is the combination of these two foregoing approaches.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 are simulated L-I curves for a single laser diode and a set of multiple diode lasers.

FIG. 2 are simulated dL/dI curves for a single laser diode and a set of multiple diode lasers.

FIG. 3 are simulated L-I curves for a single laser diode and a set of multiple diode lasers with and without current modulation.

FIG. 4 are simulated dL/dI curves for a single laser diode and a set of multiple diode lasers with and without current modulation.

FIG. 5 are simulated dL/dI curves for a single laser diode with current modulation amplitudes of 0 mA 25 mA, 50 mA, and 75 mA.

FIG. 6 are simulated dL/dI curves for a set of multiple diode lasers with current modulation amplitudes of 0 mA and 75 mA.

FIG. 7 are simulated L-I curves for a set of multiple diode lasers and the positive effect on their output when their outputs are combined.

DETAILED DESCRIPTION OF THE PREFERRED EMBODIMENTS OF THE INVENTION

Reference is now made to FIG. 1 which illustrates simulated L-I curves 10 and 12, respectively, for a single laser diode (i) and a set of four laser diodes (ii) driven with identical current values. Both curves 10 and 12 show the experience of a kink at 11 and 13, respectively, at approximately 0.25 A. FIG. 2 illustrates the slope efficiency (dL/dI) curves 14 and 16 for L-I curves 10 and 12 respectively. To be noted is that in the case of a single laser diode of curve 14, the dL/dI value can changes sign, as indicated at kink region 18, imparting a 180° phase shift on the detection system feedback employed to control the laser diode. On the other hand, for a set of multiple laser diodes, such as four independently driven single emitter laser diodes, the slope efficiency as shown in FIG. 2 remains positive even through the kink region of operation at 20 so that the system will remain operational in conjunction with conventional feedback detection systems which cannot generally deal with a phase shift in the feedback signal proportional to reverse changes in the light output. It can be seen that the use of four laser diodes in a combined output suppresses reaching negative slope efficiency values.

Constraining the slope efficiency, dL/dI, to positive values is accomplished by following the condition wherein, in a set of laser diodes, the assumption is that there is one kinking laser diode, $L_k$, and the remaining laser diodes, N−1, are unkinked lasers, $L_o$, i.e., they will not experience a kink appearance all at the same position or point along the L-I curve:

$$(N-1) \cdot (dL_o/dI) + (dL_k/dI) > 0$$

In the case of two or more kinking lasers, such as kinking laser diodes $L_{k1}$ and $L_{k2}$, with different kinking positions along the L-I curve, the combined effect in adding the light output of the two laser diodes will provide a positive value to the L-I slope. This is exemplified in FIG. 7 wherein L-I curve 31 is a first laser diode $L_{k1}$ and L-I curve 32 is a second laser diode $L_{k2}$, respectively, with kinks 33 and 34 at different current points along their respective L-I curve. These individual kinks experience a change in sign in that they do experience a negative value. With their outputs combined, however, as illustrated in L-I composite curve 40, the there is no sign change at kink positions 35 and 36, which are of continuously positive value, that is, the net effect is a positive slope along the composite L-I curve.

Rather than combining the light outputs of plural laser diodes to achieve composite positive slope values, an alternative way of eliminating the effect of a kink in one or more kinking laser diodes is to impart a high frequency modulation on the laser diode pump current and limit the feedback bandwidth to less than this modulation frequency. In this case, the feedback is the integral of the received signal. Thus, the feedback can be intentionally limited by the bandwidth of the photoreceiver, e.g., a photodiode, or implicitly as in the case of an optical component that receives the output from the laser diode or diodes which serves to provide an average of the laser diode output, L(I), over time, such as in the case of pumping an optical fiber amplifier (OFA), e.g., an erbium doped fiber amplifier (EDFA). The resulting average, L(I), can be expressed as follows:

$$L(I) = 1/dI \cdot \int_{I-dI/2}^{I+dI/2} L(I) dI$$

where dI is the depth of the current modulation. Such a modulation can be produced by adding circuit components, such as an oscillator, to the laser diode drive circuit. Such oscillators are disclosed in U.S. Pat. Nos. 5,297,154 and 5,499,135, which are incorporated herein by their reference. Another approach is by a self-oscillating circuit or self-induced oscillation in the laser diode drive circuit such as disclosed in U.S. patent application, Ser. No. 09/197,062, filed Nov. 20, 1998 and entitled, STABILIZATION OF LASER SOURCES WITH CLOSELY-COUPLED OPTICAL REFLECTORS USING AN INTERNAL DITHER CIRCUIT, assigned to the assignee herein which is incorporated herein by its reference. Also, a small modulation signal can be provided that is intrinsic to the laser diode drive circuit to pass through the circuit to the laser diode or diodes.

If the current modulation depth or amplitude is large compared to the current range over which the laser produces a kink, the effect of the kink is reduce or suppressed. FIG. 3 illustrates the L-I curves 22 and 24 for a single laser diode, respectively, with dI=0 mA and dI=25 mA. As can be seen in FIG. 3, the current modulation reduces the effect of the kink. However, as illustrated in FIG. 4, current modulation of 25 mA does not limit slope efficiency to positive values. Curve 26 is the case where no modulation is provided. Curve 28 is the case where 25 mA amplitude dither is applied to the current supplied to the laser diode. In both cases, peak kink values 30 and 32 are negative values.

Larger values of current modulation can, therefore, be employed which will continue to laterally spread out the dL/dI curve and eventually the dI values should become greater than zero. FIG. 5 illustrates simulated dL/dI curves for current modulation depths of 25 mA, 50 mA and 75 mA as superimposed on a 300 mA laser driver signal. As can been seen from FIG. 5, for modulation amplitudes or depths exceeding approximately 50 mA, the dL/dI values become positive. Thus, a dither or current modulation can be applied to one or more laser diodes that experience an L-I kink effect where the magnitude of the modulation is determined by the amount necessary relative to any particular laser diode to achieve an individual or net effect that provide for a positive slope. The modulation can be independently applied to one or more kinking laser diodes to adjust the depth of modulation to change the sign of the composite L-I curve eliminating a change in sign, i.e., going from a positive slope sign to a negative slope sign.

There may be reasons, however, not to apply such a large modulation depth, e.g., as high as 75 mA, for a given current operating level of the diode laser. Thus, the technique discussed in connection with FIGS. 1 and 2 may be combined with that of FIG. 5 to provide efficient kink reduction with minimal effect on laser diode operation. As an example, employing multiple laser diodes, such as a set of four diodes, which, as previously discussed have a slope efficiency just barely positive, as shown in FIG. 2 at 20, in combination with imparting a lower current modulation or depth, such as 25 mA superimposed on a 300 mA laser driver signal, the slope efficiency is significantly changed to positive values as illustrated in FIG. 6. In FIG. 6, the current modulation amplitude at 0 mA is just at a positive value while the current modulation amplitude at 25 mA is at a value significantly higher.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications as that are within the spirit and scope of the following claims.

What is claimed is:

1. A method of operating a laser diode in a manner that avoids L-I kink effects in the diode output the method comprising:

providing a drive current to the diode to power the diode;

generating a feedback signal in a feedback circuit having a limited frequency bandwidth, wherein a magnitude of the feedback signal is proportional to an output power of the diode;

adjusting the drive current of the diode with the feedback signal so as to maintain a predetermined diode output power; and dithering a magnitude of the drive current at a dither frequency that is higher than the frequency bandwidth of the feedback circuit.

2. The method of claim 1 wherein the dithering has a depth of modulation that is larger than a current range over which a kink would exist in an L-I characteristic curve of the diode if no L-I kink suppression was employed, where L is the light output of the diode and I is the diode drive current.

3. The method of claim 1 wherein the dithering has a depth of modulation a magnitude of which is such that a slope efficiency dL/dI of the diode is positive over an entire operating range of the diode, where L is the light output of the diode and I is the diode drive current.

4. A laser diode control apparatus for which L-I kinks are suppressed, the apparatus comprising:

at least one laser diode source providing a light output;

a driver circuit providing an operating current to said source;

a feedback circuit that provides a feedback signal to the diode that is proportional to an output power of the diode; and a dither signal generator that generates a dither signal that dithers a magnitude of the drive current, the dither signal generator having a modulation depth control that allows a magnitude of the dithering to be adjusted, the dither signal having a frequency that is higher than a frequency bandwidth of the feedback circuit.

5. The apparatus of claim 4 wherein the dither signal generator applies a depth of modulation to the dither signal that covers a current range larger than a current range over which a kink would exist in an L-I characteristic curve of the diode if no L-I kink suppression was employed, where L is the light output of the diode and I is the diode drive current.

6. The apparatus of claim 4 wherein the diode source is one of a plurality of diode sources and wherein the apparatus comprises a plurality of dither signals, each associated with a different one of said diode sources.

7. The apparatus of claim 6 wherein each of the dither signals has a different dither frequency.

* * * * *